United States Patent
Kang et al.

(10) Patent No.: US 7,466,034 B2
(45) Date of Patent: Dec. 16, 2008

(54) COGENERATION SYSTEM

(75) Inventors: Seung Tak Kang, Seoul (KR); Chang Min Choi, Seoul (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 542 days.

(21) Appl. No.: 11/155,470

(22) Filed: Jun. 20, 2005

(65) Prior Publication Data
US 2006/0191265 A1 Aug. 31, 2006

(30) Foreign Application Priority Data
Dec. 10, 2004 (KR) ............... 10-2004-0104360

(51) Int. Cl.
*H02P 9/04* (2006.01)
(52) U.S. Cl. ............... 290/40 C; 290/1 R; 290/1 B; 290/2
(58) Field of Classification Search ........... 290/40 C, 290/1 R, 1 B, 2
See application file for complete search history.

(56) References Cited
U.S. PATENT DOCUMENTS

| | | | |
|---|---|---|---|
| 4,010,378 A * | 3/1977 | Tharpe et al. ............ | 290/2 |
| 4,736,111 A | 4/1988 | Linden | |
| 6,124,644 A * | 9/2000 | Olson et al. ............ | 290/1 B |
| 6,784,574 B2 * | 8/2004 | Turner et al. ............ | 310/58 |
| 7,145,258 B2 * | 12/2006 | Kang et al. ............ | 290/2 |
| 7,208,846 B2 * | 4/2007 | Liang ............ | 290/1 R |

FOREIGN PATENT DOCUMENTS

| | | |
|---|---|---|
| GB | 2 387 641 A | 10/2003 |
| JP | 2-99750 A | 4/1990 |
| JP | 2002-4942 A | 1/2002 |

* cited by examiner

*Primary Examiner*—Darren Schuberg
*Assistant Examiner*—Iraj A Mohandesi
(74) *Attorney, Agent, or Firm*—Birch, Stewart, Kolasch & Birch, LLP (57) ABSTRACT

A cogeneration system is disclosed, wherein a generator which generates electricity, a drive source which operates to drive the generator, and generates waste heat during the operation of the drive source, a waste heat recoverer which recovers the waste heat of the drive source, and a radiator which radiates the waste heat recovered by the waste heat recoverer are arranged in a single chassis. The cogeneration system has a compact and simple arrangement, and achieves simple control operations, and an enhancement in operability.

21 Claims, 6 Drawing Sheets

COGENERATION SYSTEM

BACKGROUND OF THE INVENTION

1. Field of the Invention

The present invention relates to a cogeneration system, and, more particularly, to a cogeneration system wherein a generator, a drive source adapted to drive the generator, and a waste heat recoverer adapted to recover waste heat from the drive source are arranged in a single chassis.

2. Description of the Related Art

Figure 1:
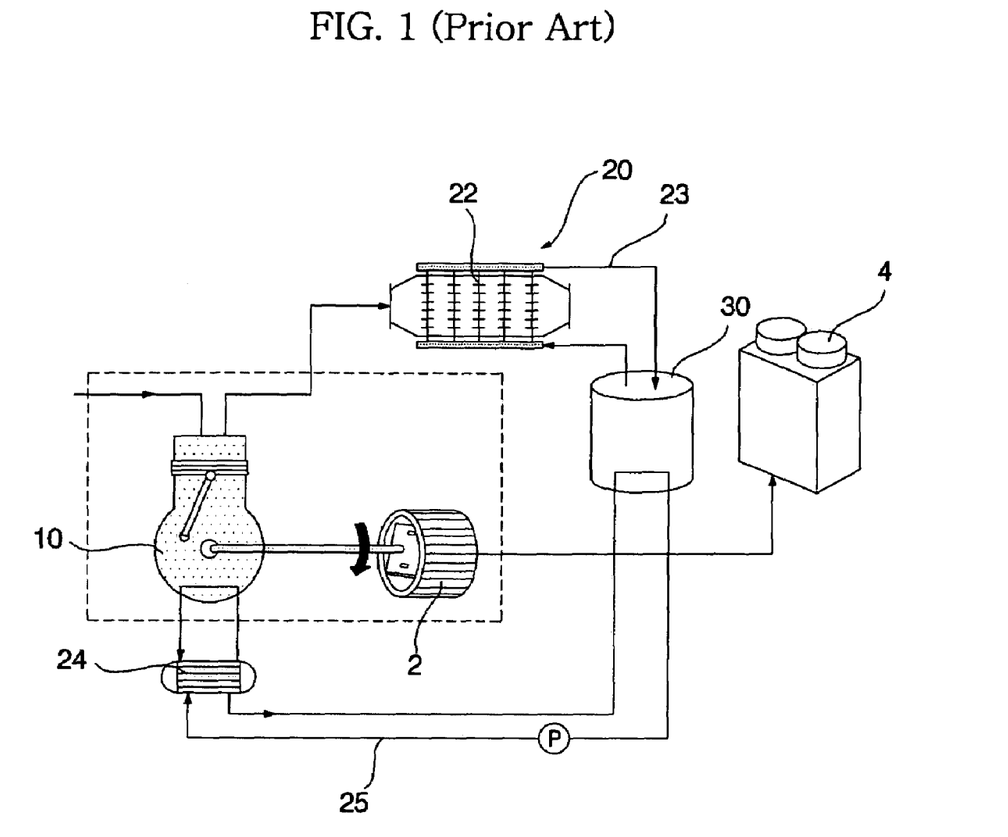
FIG. 1 is a schematic view illustrating a conventional cogeneration system.

FIG. 1 is a schematic view illustrating a conventional cogeneration system.

As shown in FIG. 1, the conventional cogeneration system includes a generator 2 to generate electricity, a drive source 10, which operates to drive the generator 2, and generates waste heat during operation thereof, such as an engine (hereinafter, the drive source 10 will be referred to as an "engine"), a waste heat recoverer 20 to recover waste heat generated from the engine 10, and a heat consumer 30 to use the waste heat recovered by the waste heat recoverer 20, such as a thermal storage tank.

The electricity generated from the generator 2 is supplied to various electric home appliances including the heat pump type air conditioner 4 and various home illumination devices.

The waste heat recoverer 20 includes an exhaust gas heat exchanger 22 to absorb heat from exhaust gas discharged from the engine 10, and a cooling water heat exchanger 24 to absorb heat from cooling water used to cool the engine 10.

The exhaust gas heat exchanger 22 is connected with the heat consumer 30 via a first heat supply line 23. Accordingly, the exhaust gas heat exchanger 22 can transfer the waste heat absorbed from the exhaust gas of the engine 10 to the heat consumer 30 via the first heat supply line 23. As mentioned above, the heat consumer 30 may be a thermal storage tank.

The cooling water heat exchanger 24 is connected with the heat consumer 30 via a second heat supply line 24. Accordingly, the cooling water heat exchanger 24 can transfer the waste heat absorbed from the cooling water of the engine 10 to the heat consumer 30 via the second heat supply line 24.

In the conventional cogeneration system having the above-mentioned configuration, however, the generator 2, engine 10, exhaust gas heat exchanger 22, and cooling water heat exchanger 24 are arranged in separate units, respectively. Accordingly, the conventional cogeneration system has problems of a complex arrangement, sophisticated control operations, a degradation in operability, and a reduction in the amount of waste heat transferred to the heat consumer 30.

SUMMARY OF THE INVENTION

The present invention has been made in view of the above-mentioned problems, and it is an object of the invention to provide a cogeneration system wherein an engine, a generator, a waste heat recoverer, and a radiator are combined into a single unit, so that the cogeneration system has a compact and simple arrangement, and achieves simple control operations, and an enhancement in operability.

In accordance with the present invention, this object is accomplished by providing a cogeneration system comprising: a generator which generates electricity; a drive source which operates to drive the generator, and generates waste heat during the operation of the drive source; a waste heat recoverer which recovers the waste heat of the drive source; a waste heat supplier which transfers the waste heat recovered by the waste heat recoverer to a heat consumer; and a radiator which radiates the waste heat recovered by the waste heat recoverer, wherein the generator, the drive source, the waste heat recoverer, and the radiator are arranged in a single chassis.

The drive source may be an engine or a fuel cell.

The drive source may include an air suction tube adapted to suck air present around the chassis into the drive source.

The cogeneration system may further comprise a muffler mounted to an exhaust tube adapted to discharge exhaust gas from the drive source.

The cogeneration system may further comprise a muffler casing mounted to the chassis, and adapted to protect the muffler and to shield noise of the muffler.

The muffler casing may comprises a first muffler casing mounted on a top of the chassis such that the first muffler casing surrounds the muffler, and provides a passage, through which air absorbing heat from the engine room passes, and a second muffler casing arranged at one side of the first muffler casing to provide a passage, through which the air emerging from the first muffler casing passes to be outwardly discharged.

The chassis may include an engine room defined in the chassis to receive the generator, the drive source, and the waste heat recoverer.

The waster heat supplier may be arranged in the engine room.

The cogeneration system may further comprise a ventilation device mounted to the chassis to radiate heat from the engine room.

The ventilation device may comprise a ventilation casing which communicates with the engine room of the chassis, and includes a grill mounted to one side of the ventilation casing, and a ventilation fan connected to a motor arranged in the ventilation casing to blow outdoor air to the engine room.

The radiator may be arranged on a top of the chassis to discharge heat upwardly from the chassis.

The radiator may comprise a bypass line branched from a heat transfer line adapted to transfer the waste heat recovered by the waste heat recoverer to the waste heat supplier, a radiating heat exchanger, through which the bypass line extends, a radiating fan arranged to blow outdoor air to the radiating heat exchanger, and a grill arranged over the radiating heat exchanger and the radiating fan.

The cogeneration system may further comprise a partition wall which isolates the radiator and the engine room from each other.

The cogeneration system according to the present invention has advantages in that the cogeneration system has a compact and simple arrangement, and achieves simple control operations, and an enhancement in operability.

The cogeneration system according to the present invention also has advantages in that the drive source can operate stably and efficiently irrespective of an increase in the internal temperature of the chassis because the air suction tube of the drive source is arranged to suck air present around the chassis.

The cogeneration system according to the present invention also has advantages in that the drive source includes the muffler mounted to the exhaust tube, and the cogeneration unit includes the muffler casing adapted to protect the muffler and to shield noise of the muffler, so that it is possible to obtain superior noise attenuation effects and to protect the muffler from snow, rain, or the like.

The cogeneration system according to the present invention also has advantages in that the chassis defines therein the engine room, in which the generator, drive source, and waste heat recoverer are arranged, and the cogeneration system also includes the ventilation device adapted to radiate heat from the engine room, so that it is possible to prevent the engine room from being overheated, and to achieve an enhancement in the efficiency of the engine and other devices.

The cogeneration system according to the present invention also has advantages in that it is possible to more efficiently supply the waste heat of the engine because the waste heat supplier is arranged in the engine room to transfer the waste heat recovered by the waste heat recoverer to a heat consumer.

In addition, the cogeneration system according to the present invention has advantages in that it is possible to efficiently radiate waste heat because the radiator is isolated from the engine room by the partition wall, and is arranged on the top of the chassis, so as to discharge heat upwardly from the chassis.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings. In the following description, identical elements are referred to by the same title and designated by the same reference numeral, without any redundant description thereof.

Figure 2:
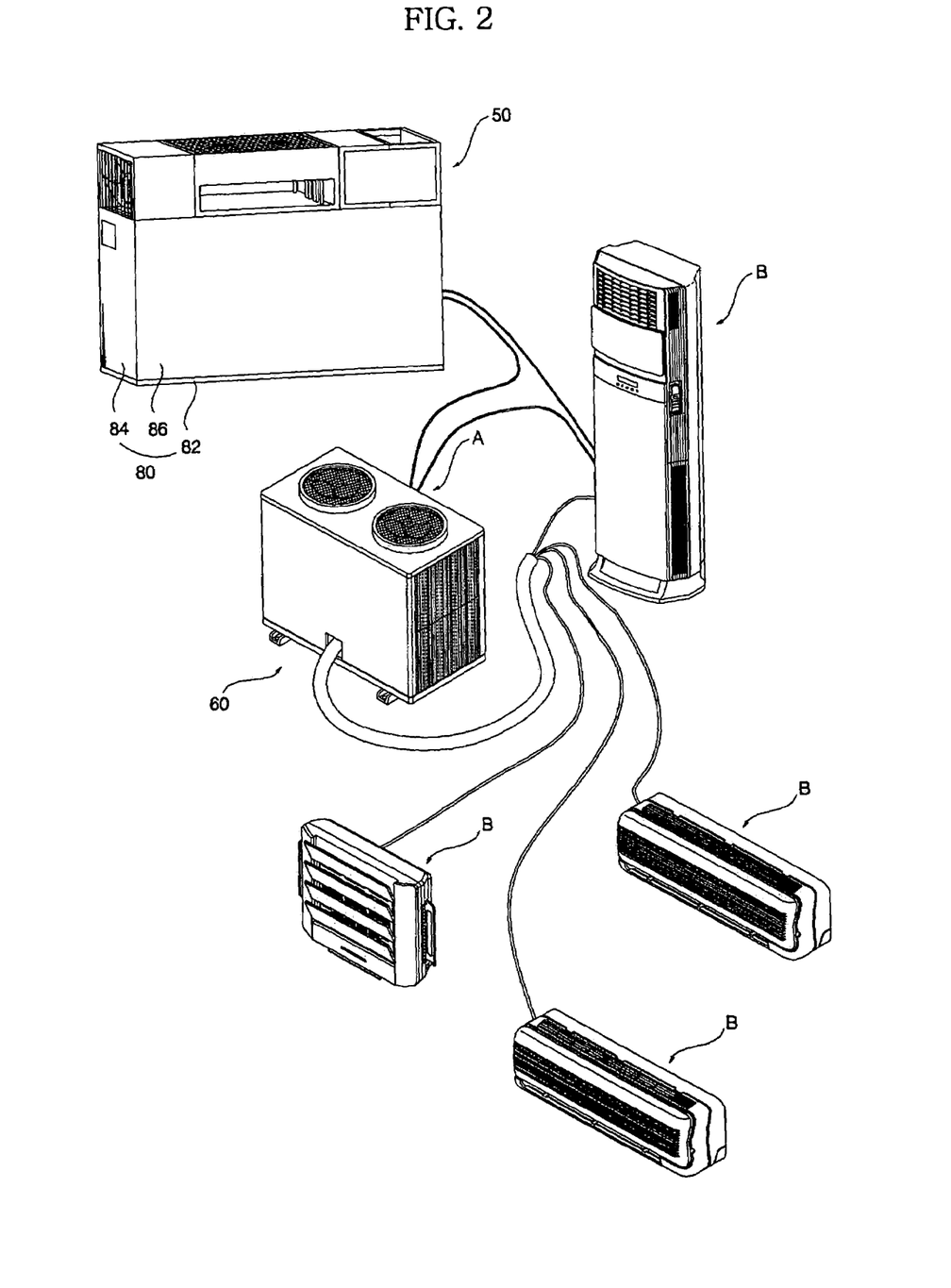
FIG. 2 is a perspective view illustrating a cogeneration system according to the present invention.

FIG. 2 is a perspective view illustrating a cogeneration system according to the present invention.

As shown in FIG. 2, the cogeneration system includes a cogeneration unit 50, in which an engine and a generator are arranged, and a heat consumer 60, which utilizes electricity generated from the cogeneration unit 50 and waste heat recovered from the cogeneration unit 50.

The heat consumer 60 includes a heat pump type air conditioner, which includes an outdoor unit A and indoor units B having heating and cooling functions.

Figure 3:
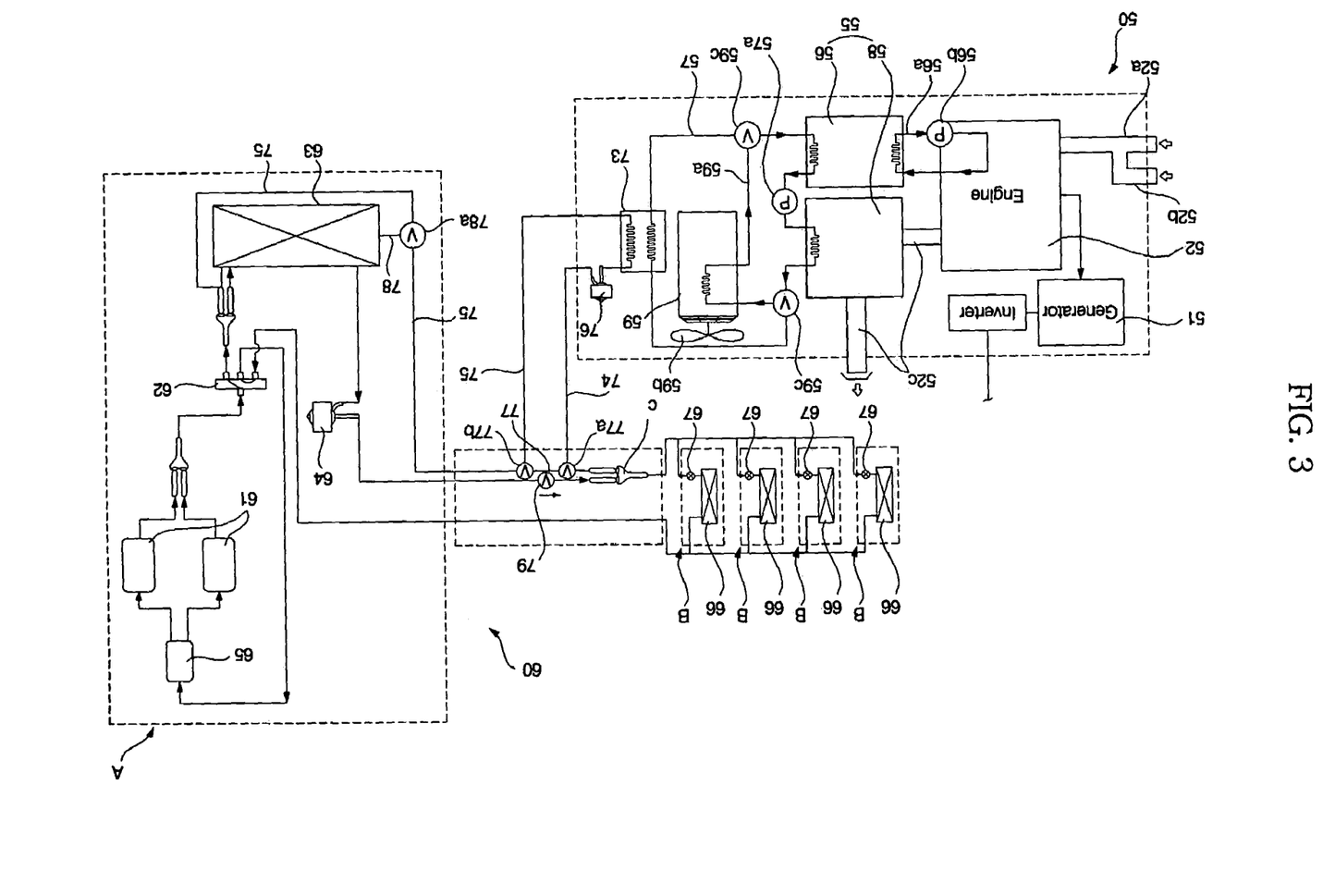
FIG. 3 is a schematic diagram of a cogeneration system according to a first embodiment of the present invention, illustrating a condition in which a heat consumer included in the cogeneration system operates in cooling mode.
Figure 4:
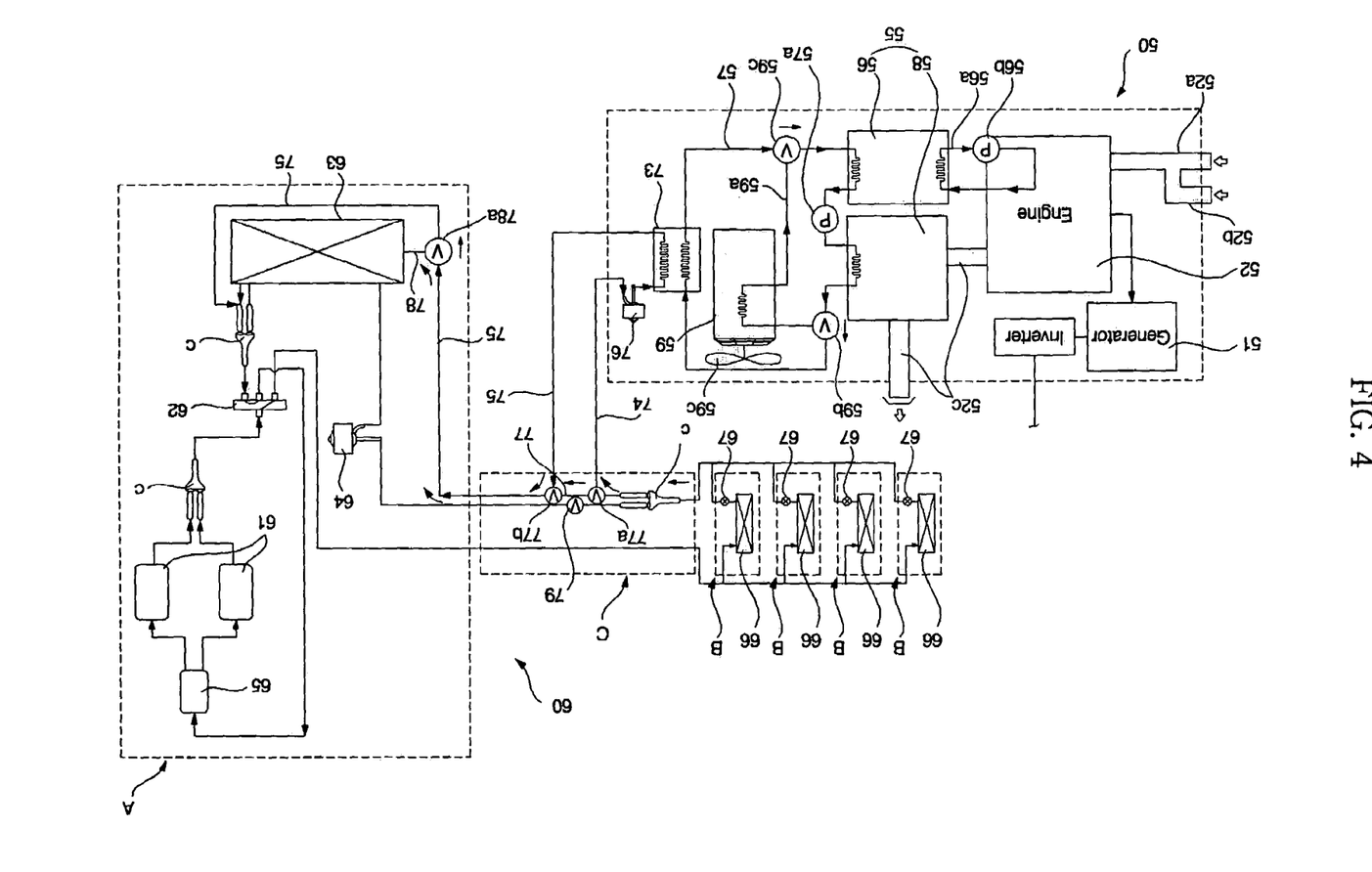
FIG. 4 is a schematic diagram of the cogeneration system according to the first embodiment of the present invention, illustrating a condition in which the heat consumer operates in heating mode.

FIG. 3 is a schematic diagram of a cogeneration system according to a first embodiment of the present invention, illustrating a condition in which a heat consumer included in the cogeneration system operates in cooling mode. FIG. 4 is a schematic diagram of the cogeneration system according to the first embodiment of the present invention, illustrating a condition in which the heat consumer operates in heating mode.

The cogeneration unit 50 includes a generator 51 to generate electricity, and a drive source 52, which operates to drive the generator 51, and generates waste heat during operation thereof. The cogeneration unit 50 also includes a waste heat recoverer 55 to recover the waste heat of the drive source 52, a radiator 59 to radiate the waste heat recovered by the waste heat recoverer 55, and a waste heat supplier 73 to supply the waste heat recovered by the waste heat recoverer 55 to the heat consumer 60, that is, the heat pump type air conditioner.

The generator 51 may be an AC generator or a DC generator. The generator 51 includes a rotor coupled to an output shaft of the drive source 52 so that the generator 51 generates electricity during rotation of the output shaft.

The generator 51 supplies the generated electricity to the heat pump type air conditioner 60 and other devices.

The drive source 52 comprises a fuel cell or an engine, which operates using fuel such as liquefied gas or liquefied petroleum gas. For simplicity of description, the following description will be given only in conjunction with the case in which the drive source 52 comprises an engine.

A fuel supply tube 52a, an air suction tube 52b, and an exhaust tube 52c are connected to the engine 52. The fuel supply tube 52a is adapted to supply fuel such as liquefied gas or liquefied petroleum gas to the engine 52. The air suction tube 52b is joined to the fuel supply tube 52a to suck air into the engine 52. The exhaust tube 52c is adapted to discharge exhaust gas generated from the engine 52 to the atmosphere.

The waste heat recoverer 55 includes a cooling water heat exchanger 56 connected to the engine 52 via a cooling water line 56a to recover heat of cooling water used to cool the engine 52, and an exhaust gas heat exchanger 58 arranged at the exhaust tube 52c to recover waste heat of exhaust gas discharged from the engine 52.

A cooling water circulation pump 56b is arranged at the engine 52 or cooling water line 56a to cause the cooling water to be circulated through the engine 52 and cooling water heat exchanger 56.

The cooling water heat exchanger 56 and exhaust gas heat exchanger 58 are connected to the waste heat supplier 73 via a heat transfer line 57 to transfer the waste heat recovered during the operation of the engine 52 to the waste heat supplier 73.

A heat medium circulation pump 57a is arranged at the heat transfer line 57 to cause the heat medium to be circulated through the cooling water heat exchanger 56, exhaust gas heat exchanger 58, and waste heat supplier 73.

The radiator 59 includes a radiating heat exchanger to radiate the waste heat of the engine 52 to the atmosphere when it is unnecessary to transfer the waste heat of the engine 52 to the waste heat supplier 73. A bypass line 59a, which is branched from the heat transfer line 57, extends through the radiating heat exchanger. Valves 59b and 59c are arranged at the bypass line 59a to change the flow path of the heat medium.

The radiator 59 further includes a radiating fan 59c to blow outdoor air to the radiating heat exchanger.

When the heat pump type air conditioner 60 operates in cooling mode or under an overloaded heating condition, the valves 59b and 59c change the flow path of the heat medium toward the radiating heat exchanger of the radiator 59. In this case, the radiating fan 59c is also rotated.

Meanwhile, The outdoor unit A of the heat pump type air conditioner 60 includes compressors 61, a 4-way valve 62, an outdoor heat exchanger 63, an expansion device 64 such as an LEV (hereinafter, referred to as an "outdoor expansion device"), and an accumulator 65.

Each indoor unit B of the heat pump type air conditioner 60 includes an indoor heat exchanger 66.

Each indoor unit B also includes an expansion device 67 such as an LEV (hereinafter, referred to as an "indoor expansion device").

The waste heat supplier 73 is arranged in the cogeneration unit 50, so as to function as a second outdoor heat exchanger adapted to cause waste heat fed through the heat transfer line 57 during the heating operation of the heat pump type air conditioner 60 to be transferred to a refrigerant circulating through the heat pump type air conditioner 60.

The second outdoor heat exchanger 73 can operate to condense the refrigerant, alone or in cooperation with the outdoor heat exchanger 73 of the outdoor unit A (hereinafter, referred to as a "first outdoor heat exchanger").

That is, in the cogeneration system, the refrigerant is introduced only into the first outdoor heat exchanger 63 when the heat pump type air conditioner 60 is in a heating overload state, and is introduced only into the second heat exchanger 73 or into both the first and second outdoor heat exchangers 63 and 73 when the heat pump type air conditioner 60 is not in the heating overload state.

The second outdoor heat exchanger 73 is connected to a refrigerant suction line 74 branched from a refrigerant line extending between the indoor expansion devices 67 and the outdoor expansion device 64, and is connected with the 4-way valve 62 via a refrigerant discharge line 75.

An expansion device 76 (hereinafter, referred to as a "cogeneration expansion unit") is arranged at the refrigerant suction line 74 to re-expand the refrigerant, which has been expanded in the indoor expansion devices 67 after being condensed in the indoor heat exchangers 66 during the heating operation of the heat pump type air conditioner 60, before being introduced into the second outdoor heat exchanger 73.

A bypass line 77 is connected between the refrigerant suction line 74 and the refrigerant discharge line 75 to guide the refrigerant passing through the inner heat exchangers 66 and indoor expansion devices 67 to flow through the refrigerant discharge line 75 while bypassing the cogeneration expansion device 76 and second outdoor heat exchanger 73.

Switching valves 77a and 77b are arranged at the bypass line 77 to control opening/closing of the refrigerant suction line 74, refrigerant discharge line 75, and bypass line 77 in accordance with the heating load of the heat pump type air conditioner 60.

When the heating load of the heat pump type air conditioner 60 is low, the switching valves 77a and 77b operate to allow the refrigerant passing through the indoor heat exchangers 66 and indoor expansion devices 67 to enter the refrigerant suction line 74, and thus, to pass through the cogeneration expansion device 76 and second outdoor heat exchanger 73. On the other hand, when the heating load of the heat pump type air conditioner 60 is excessive, the switching valves 77a and 77b operate to allow the refrigerant passing through the indoor heat exchangers 66 and indoor expansion devices 67 to pass through the bypass line 77 while bypassing the cogeneration expansion device 76 and second outdoor heat exchanger 73.

Meanwhile, a bypass line 78 is connected between the refrigerant discharge line 75 and the first outdoor heat exchanger 63 to guide the refrigerant passing through the refrigerant discharge line 75 to enter the first outdoor heat exchanger 63 so that the refrigerant is evaporated in the first outdoor heat exchanger 63.

A switching valve 78a is arranged at the bypass line 78 to control opening/closing of the bypass line 78 in accordance with whether the heating load of the heat pump type air conditioner 60 is excessive, that is, whether the heat pump type air conditioner 60 is in a heating overload state, and the result of a comparison between an evaporation temperature and the outdoor temperature.

When the heat pump type air conditioner 60 is not in a heating overload state, and the outdoor temperature is higher than the evaporation temperature, the switching valve 78a opens the bypass line 78 to cause the refrigerant evaporated in the second outdoor heat exchanger 73 to pass through the first outdoor heat exchanger 63 so that the refrigerant is re-evaporated in the first outdoor heat exchanger 63. On the other hand, when the heat pump type air conditioner 60 is in a heating overload state, the switching valve 78a opens the bypass line 78 to cause the refrigerant passing through the indoor expansion device 67 to pass through the first outdoor heat exchanger 63 so that the refrigerant is evaporated in the first outdoor heat exchanger 63.

On the other hand, when the heat pump type air conditioner 60 is not in a heating overload state, and the outdoor temperature is not higher than the evaporation temperature, the switching valve 78a closes the bypass line 78 to cause the refrigerant evaporated in the second outdoor heat exchanger 73 to enter the 4-way valve 62 without passing through the first outdoor heat exchanger 63.

Reference numeral 79 designates a check valve adapted to open the refrigerant line between the expansion device 64 and the indoor heat exchangers 66 during the cooling operation of the heat pump type air conditioner 60, thereby allowing the refrigerant expanded while passing through the expansion device 64 to enter the indoor heat exchangers 66, and to close the refrigerant line between the expansion device 64 and the indoor heat exchangers 66 during the heating operation of the heat pump type air conditioner 60, thereby allowing the refrigerant condensed while passing through the indoor heat exchangers 66 to enter the refrigerant suction line 74.

Reference numeral C designates a distributor, at which the refrigerant lines are branched.

Figure 5:
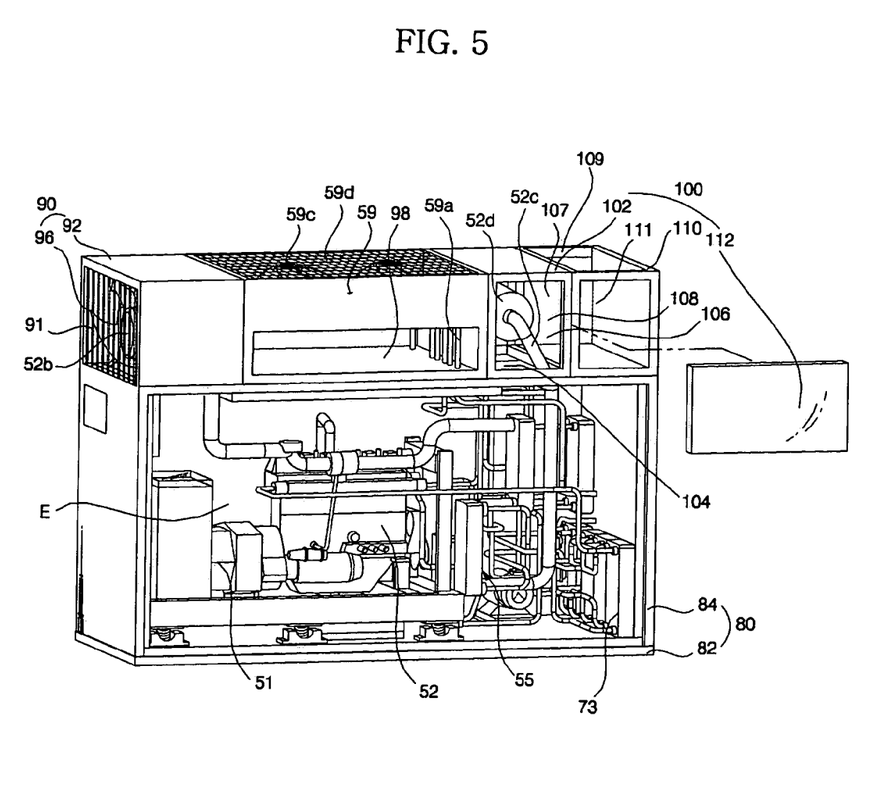
FIG. 5 is an exploded perspective view of the cogeneration unit shown in FIGS. 2 to 4.

FIG. 5 is an exploded perspective view of the cogeneration unit shown in FIGS. 2 to 4.

As shown in FIG. 5, the cogeneration unit 50 includes a chassis 80, in which the generator 51, engine 52, waste heat recoverer 55, radiator 59, and waste heat supplier 73 are mounted.

The chassis 80 defines an engine room E therein, and includes a base 82, a cabinet 84 mounted on the base 82 to form left, right, and rear walls of the chassis 80, and a front cover 86 covering the front side of the cabinet 84.

The chassis 80 is opened at the top side thereof.

The generator 51, engine 52, waste heat recoverer 55, and waste heat supplier 73 are arranged in the engine room E.

A ventilation device 90 is mounted to the top of the engine room E to radiate heat from the interior of the chassis 80.

The ventilation device 90 includes a ventilation casing 92 communicating with the engine room E of the chassis 80, and including a grill 91 mounted to one side of the ventilation casing 92. The ventilation device 90 also includes a ventilation fan 96 connected to a motor arranged in the ventilation casing 92 to blow outdoor air to the engine room E.

The radiator 59, which is arranged on the top of the engine room E, upwardly discharges heat absorbed by the waste heat recoverer 55.

The radiator 59 is isolated from the engine room E by a partition wall 98.

The radiator 59 also includes a grill 59d arranged over the radiating heat exchanger and radiating fan 59c.

Meanwhile, the air suction tube 52b of the engine 52 is arranged to suck outdoor air from the chassis 80.

The air suction tube 52b may extend to a position near the grill 91 such that a portion of the air passing through the grill 91 is directly sucked into the air suction tube 52b without being introduced into the engine room E. Alternately, the air suction tube 52b may extend through the grill 91 such that air is directly sucked into the air suction tube 52b. For simplicity of description, the following description will be given only in conjunction with the case in which the air suction tube 52b extends to a position near the grill 91.

Also, a muffler 52d is attached to the exhaust tube 52c of the engine 52. The cogeneration unit 50 also includes a muffler casing 100, which protects the muffler 52d from snow, rain, or the like, and shields noise generated from the muffler 52d.

The muffler casing 100 includes a first muffler casing 102 mounted on the top of the chassis 80 such that the first muffler casing 102 surrounds the muffler 52d, and provides a passage, through which air absorbing heat from the engine room E passes.

The muffler casing 100 also includes a second muffler casing 110 arranged at one side of the first muffler casing 102 to provide a passage, through which the air emerging from the first muffler casing 102 passes to be outwardly discharged.

The first muffler casing 102 includes an opening 104 formed at the bottom side of the first muffler casing 102 to allow the exhaust tube 52c extending from the engine room E to pass through the opening 104, and an opening 106 formed at one side of the first muffler casing 102.

The second muffler casing 110 includes an opening 108, which communicates with the side opening 106 of the first muffler casing 102, and an exhaust hole 109 formed at the top side of the second muffler casing 110.

Openings 107 and 111 are formed at respective front sides of the first and second muffler casings 102 and 110.

The muffler casing 110 further includes a muffler cover 112, which covers the openings 107 and 111.

A through hole (not shown) is also formed at a selected one of the first muffler casing 102, second muffler casing 110, and muffler cover 112 to allow the exhaust tube 52c to extend through the through hole.

Hereinafter, operation of the cogeneration unit 50 having the above-described configuration will be described.

When the engine 52 is driven, air present around the cogeneration unit 50, in particular, around the grill 91, is sucked into the engine 52 via the air suction tube 52b. In accordance with the driving of the engine 52, the rotor of the generator 51 is also rotated, thereby generating electricity. The electricity is supplied to the heat pump type air conditioner 60 and other devices.

During the operation of the engine 52, waste heat of the exhaust gas of the engine 52 and waste heat of the cooling water of the engine 52 are recovered by the waste heat recoverer 55 which, in turn, transfers the recovered waste heat to the waste heat supplier 73 or discharges the recovered waste heat upwardly from the chassis 80 via the radiator 59.

Meanwhile, the exhaust gas of the engine 52 is noise-attenuated while passing through the muffler 52d, and is then outwardly discharged from the cogeneration unit 50. Noise propagated around the muffler 52d is shielded by the muffler casing 100 arranged around the muffler 52d.

During the operation of the engine 52, the ventilation fan 96 rotates, so that air present around the cogeneration unit 60 is sucked into the ventilation casing 92 via the grill 91, and is then introduced into the engine room E after passing through the ventilation casing 92.

The air introduced into the engine room E absorbs heat from the generator 51 and engine 52, and is then outwardly discharged through the top side of the second muffler casing 110 after sequentially moving into the interior of the first muffler casing 102 through the opened bottom side of the first muffler casing 102, and moving into the interior of the second muffler casing 110 through the opened side portion of the first muffler casing 102.

Figure 6:
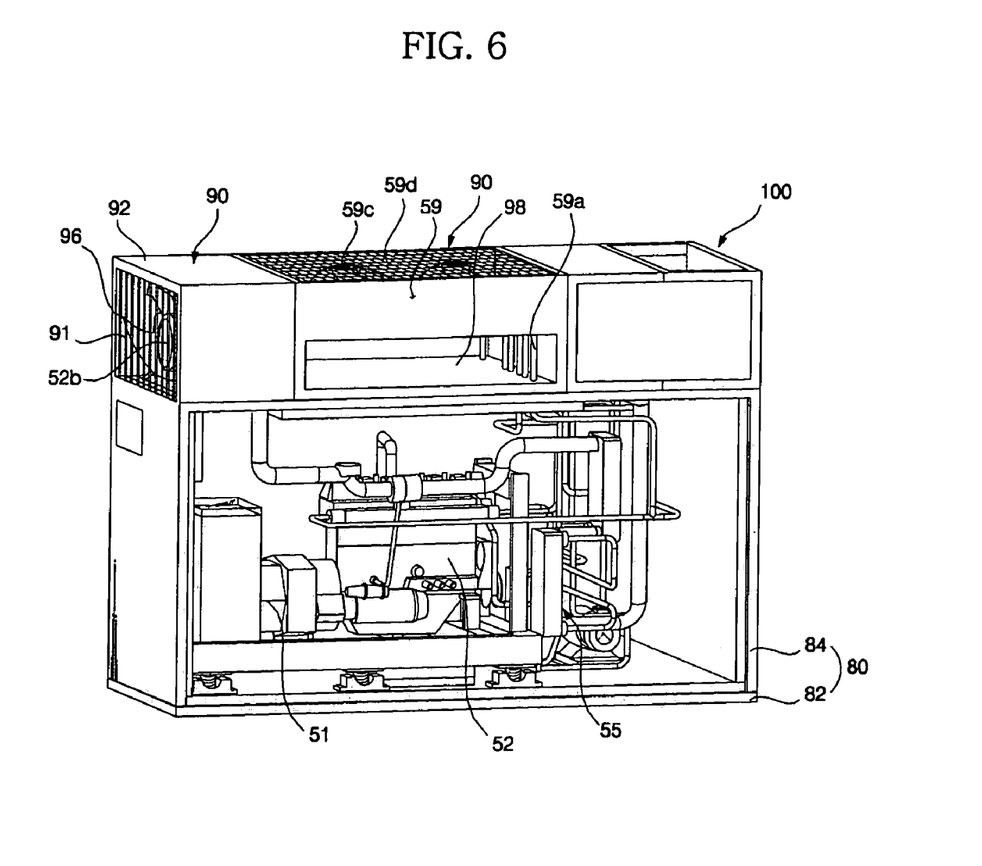
FIG. 6 is an exploded perspective view of a cogeneration system according to a second embodiment of the present invention.

FIG. 6 is an exploded perspective view of a cogeneration system according to a second embodiment of the present invention.

As shown in FIG. 6, in the cogeneration system according to this embodiment, the waste heat supplier 73 is not arranged in the cogeneration unit 50, but is arranged in the outdoor unit A or in a separate unit (not shown). The cogeneration system of this embodiment has the same configuration and functions as those of the first embodiment, except for the waste heat supplier 73. Accordingly, the constituent elements of the second embodiment respectively corresponding to those of the first embodiment are designated by the same reference numerals, and no detailed description thereof will be given.

The waste heat supplier 73 may constitute the second outdoor heat exchanger adapted to evaporate the refrigerant circulated through the heat pump type air conditioner 60, as in the first embodiment. Alternately, the waste heat supplier 73 may constitute a pre-heater arranged in the outdoor unit A to pre-heat outdoor air sucked into the first outdoor heat exchanger or a compressor discharge line heater arranged in the outdoor unit A to heat the refrigerant compressed in the compressors of the outdoor unit A.

The cogeneration system according to any one of the above-described embodiments of the present invention has various effects.

That is, first, the cogeneration system according to the present invention has advantages in that the cogeneration system has a compact and simple arrangement, and achieves simple control operations, and an enhancement in operability because the generator, which generates electricity, the drive source, which operates to drive the generator, and generates waste heat during the operation of the drive source, the waste heat recoverer, which recovers the waste heat of the drive source, and the radiator, which radiates the waste heat of the drive source, are arranged in the interior of the single chassis.

Second, the cogeneration system according to the present invention has advantages in that the drive source can operate stably and efficiently irrespective of an increase in the internal temperature of the chassis because the air suction tube of the drive source is arranged to suck air present around the chassis.

Third, the cogeneration system according to the present invention has advantages in that the drive source includes the muffler mounted to the exhaust tube, and the cogeneration unit includes the muffler casing adapted to protect the muffler and to shield noise of the muffler, so that it is possible to obtain superior noise attenuation effects and to protect the muffler from snow, rain, or the like.

Fourth, the cogeneration system according to the present invention has advantages in that the chassis defines therein the engine room, in which the generator, drive source, and waste heat recoverer are arranged, and the cogeneration system also includes the ventilation device adapted to radiate heat from the engine room, so that it is possible to prevent the engine room from being overheated, and to achieve an enhancement in the efficiency of the engine and other devices.

Fifth, the cogeneration system according to the present invention has advantages in that it is possible to more efficiently supply the waste heat of the engine because the waste heat supplier is arranged in the engine room to transfer the waste heat recovered by the waste heat recoverer to a heat consumer.

Sixth, the cogeneration system according to the present invention has advantages in that it is possible to efficiently radiate waste heat because the radiator is isolated from the engine room by the partition wall, and is arranged on the top of the chassis, so as to discharge heat upwardly from the chassis.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   a generator which generates electricity;
   a drive source which operates to drive the generator, and generates waste heat during the operation of the drive source;
   a waste heat recoverer which recovers the waste heat of the drive source;
   a waste heat supplier which transfers the waste heat recovered by the waste heat recoverer to a heat consumer; and
   a radiator which radiates the waste heat recovered by the waste heat recoverer, wherein the generator, the drive source, the waste heat recoverer, and the radiator are arranged in a single chassis,
   wherein the radiator includes:
   a bypass line branched from a heat transfer line adapted to transfer the waste heat recovered by the waste heat recoverer to the waste heat supplier;
   a radiating heat exchanger, through which the bypass line extends; and
   a valve arranged at the bypass line such that the waste heat recovered by the waste heat recoverer is transferred selectively to the waste heat supplier or to the radiating heat exchanger according to a control of the valve.

2. The cogeneration system according to claim 1, wherein the drive source is an engine or a fuel cell.

3. The cogeneration system according to claim 1, wherein the drive source includes an air suction tube adapted to suck air present around the chassis into the drive source.

4. The cogeneration system according to claim 1, further comprising: a muffler mounted to an exhaust tube adapted to discharge exhaust gas from the drive source.

5. The cogeneration system according to claim 3, further comprising: a muffler casing mounted to the chassis, and adapted to protect the muffler and to shield noise of the muffler.

6. The cogeneration system according to claim 5, wherein the muffler casing comprises:
   a first muffler casing mounted on a top of the chassis such that the first muffler casing surrounds the muffler, and provides a passage, through which air absorbing heat from the engine room passes; and
   a second muffler casing arranged at one side of the first muffler casing to provide a passage, through which the air emerging from the first muffler casing passes to be outwardly discharged.

7. The cogeneration system according to claim 1, wherein the chassis includes an engine room defined in the chassis to receive the generator, the drive source, and the waste heat recoverer.

8. The cogeneration system according to claim 7, wherein the waster heat supplier is arranged in the engine room.

9. The cogeneration system according to claim 7, further comprising: a ventilation device mounted to the chassis to radiate heat from the engine room.

10. The cogeneration system according to claim 9, wherein the ventilation device comprises: a ventilation casing which communicates with the engine room of the chassis, and includes a grill mounted to one side of the ventilation casing; and a ventilation fan connected to a motor arranged in the ventilation casing to blow outdoor air to the engine room.

11. The cogeneration system according to claim 7, wherein the radiator is arranged on a top of the chassis to discharge heat upwardly from the chassis.

12. The cogeneration system according to claim 11, wherein the radiator includes:
   a radiating fan arranged to blow outdoor air to the radiating heat exchanger; and
   a grill arranged over the radiating heat exchanger and the radiating fan.

13. The cogeneration system according to claim 7, further comprising: a partition wall which isolates the radiator and the engine room from each other.

14. A cogeneration system comprising:
   a generator which generates electricity;
   a drive source which operates to drive the generator, and generates waste heat during the operation of the drive source;
   a waste heat recoverer which recovers the waste heat of the drive source;
   a waste heat supplier which transfers the waste heat recovered by the waste heat recoverer to a heat consumer;
   a chassis which includes an engine room defined in the chassis to receive the generator, the drive source, the waste heat recoverer, and the waste heat supplier;
   a radiator mounted to the chassis to radiate the waste heat recovered by the waste heat recoverer;
   a muffler mounted to an exhaust tube adapted to discharge exhaust gas from the drive source;
   a muffler casing mounted to the chassis, and adapted to protect the muffler and to shield noise of the muffler; and
   a ventilation device mounted to the chassis to suck air present around the chassis into the engine room, and to outwardly discharge the air from the engine room via the muffler casing for heat radiation of the engine room.

15. The cogeneration system according to claim 14, wherein the drive source is an engine or a fuel cell.

16. The cogeneration system according to claim 14, wherein the chassis comprises:
   a base;
   a cabinet mounted on the base to form left, right, and rear walls of the chassis; and
   a front cover covering a front side of the cabinet.

17. The cogeneration system according to claim 14, wherein the radiator comprises:
   a bypass line branched from a heat transfer line adapted to transfer the waste heat recovered by the waste heat recoverer to the waste heat supplier;
   a radiating heat exchanger, through which the bypass line extends;
   a radiating fan arranged to blow outdoor air to the radiating heat exchanger; and
   a grill arranged over the radiating heat exchanger and the radiating fan.

18. The cogeneration system according to claim 14, wherein the muffler casing comprises:
   a first muffler casing mounted on a top of the chassis such that the first muffler casing surrounds the muffler, and provides a passage, through which air absorbing heat from the engine room passes; and a second muffler casing arranged at one side of the first muffler casing to provide a passage, through which the air emerging from the first muffler casing passes to be outwardly discharged.

19. The cogeneration system according to claim 14, wherein the ventilation device comprises:

a ventilation casing which communicates with the engine room of the chassis, and includes a grill mounted to one side of the ventilation casing; and a ventilation fan connected to a motor arranged in the ventilation casing to blow outdoor air to the engine room.

20. The cogeneration system according to claim 18, further comprising:

an air suction tube connected to the drive source, the air suction tube extending to a position near a grill communicating with the engine room such that a part of air passing through the grill is directly sucked into the air suction tube without being introduced into the engine room.

21. A cogeneration system comprising:

a generator which generates electricity;

a drive source which operates to drive the generator, and generates waste heat during the operation of the drive source;

a waste heat recoverer which recovers the waste heat of the drive source;

a chassis which includes an engine room defined in the chassis to receive the generator, the drive source, and the waste heat recoverer;

a radiator mounted to the chassis to radiate the waste heat recovered by the waste heat recoverer;

a muffler mounted to an exhaust tube adapted to discharge exhaust gas from the drive source; a muffler casing mounted to the chassis, and adapted to protect the muffler and to shield noise of the muffler; and a ventilation device mounted to the chassis to suck air present around the chassis into the engine room, and to outwardly discharge the air from the engine room via the muffler casing for heat radiation of the engine room.

* * * * *